United States Patent [19]

Masunaga

[11] Patent Number: 5,751,445
[45] Date of Patent: May 12, 1998

[54] IMAGE TRANSMISSION SYSTEM AND TERMINAL DEVICE

[76] Inventor: Makoto Masunaga, c/o Canon Kabushiki Kaisha 30-2, 3-chome, Shimomaruko, Ohta-ku, Tokyo, Japan

[21] Appl. No.: 334,369

[22] Filed: Nov. 3, 1994

Related U.S. Application Data

[63] Continuation of Ser. No. 973,668, Nov. 9, 1992, abandoned.

[30] Foreign Application Priority Data

Nov. 11, 1991 [JP] Japan .................... 3-294201

[51] Int. Cl.⁶ .................................... H04N 1/00
[52] U.S. Cl. ................. 358/426; 358/434; 358/439; 348/220; 395/807
[58] Field of Search .................. 348/906, 220, 348/221, 213, 210, 91, 18, 19; 358/443, 448, 404, 405, 479, 442, 468, 434, 439; 395/807

[56] References Cited

U.S. PATENT DOCUMENTS

| | | | |
|---|---|---|---|
| 4,546,390 | 10/1985 | Konishi et al. | 348/220 |
| 4,691,253 | 9/1987 | Silver | 360/33.1 |
| 4,714,963 | 12/1987 | Vogel | 358/909 |
| 4,780,764 | 10/1988 | Kinoshita et al. | 348/220 |
| 4,788,565 | 11/1988 | Masuda et al. | 358/909 |
| 4,819,059 | 4/1989 | Pape | 358/12 |
| 4,837,628 | 6/1989 | Sasaki | 348/220 |
| 4,963,980 | 10/1990 | Suga et al. | 348/220 |
| 5,027,400 | 6/1991 | Baji et al. | 358/86 |
| 5,036,390 | 7/1991 | Masunaga | |
| 5,063,440 | 11/1991 | Hong | 358/479 |
| 5,136,628 | 8/1992 | Araki et al. | 379/53 |
| 5,150,207 | 9/1992 | Someya | 358/133 |
| 5,150,209 | 9/1992 | Baker et al. | 358/136 |
| 5,192,999 | 3/1993 | Graczyk et al. | 358/85 |
| 5,270,810 | 12/1993 | Nishimura | 348/220 |
| 5,387,928 | 2/1995 | Nishimura | 348/70 |

*Primary Examiner*—Edward L. Coles, Sr.
*Assistant Examiner*—Madeleine A. V. Nguyen
*Attorney, Agent, or Firm*—Fitzpatrick, Cella, Harper & Scinto

[57] ABSTRACT

A clear print image is obtained from a moving image. A switch (66) for selectively supplying an output from a moving image input camera (60) or a still image input picture/image camera (64) to a still image coding circuit (68) is arranged in an image transmission terminal device (50). An output from a still image decoding circuit (82) is connected to a printer (86) in an image receiving terminal device. When a print image of an image photographed by the camera (60) is required, a moving image print indication is made at an operation panel (88). A data control circuit (76) supplies a switching signal for the switch (66) to the terminal device (50) to switch the switch (66) to the output side of the camera (60). The output from the camera (60) is sent through a still image processing system (68, 70, 72, 74, 76, 82). A clear, high-quality image signal of the image photographed by the camera (60) is supplied to the printer (86).

17 Claims, 4 Drawing Sheets

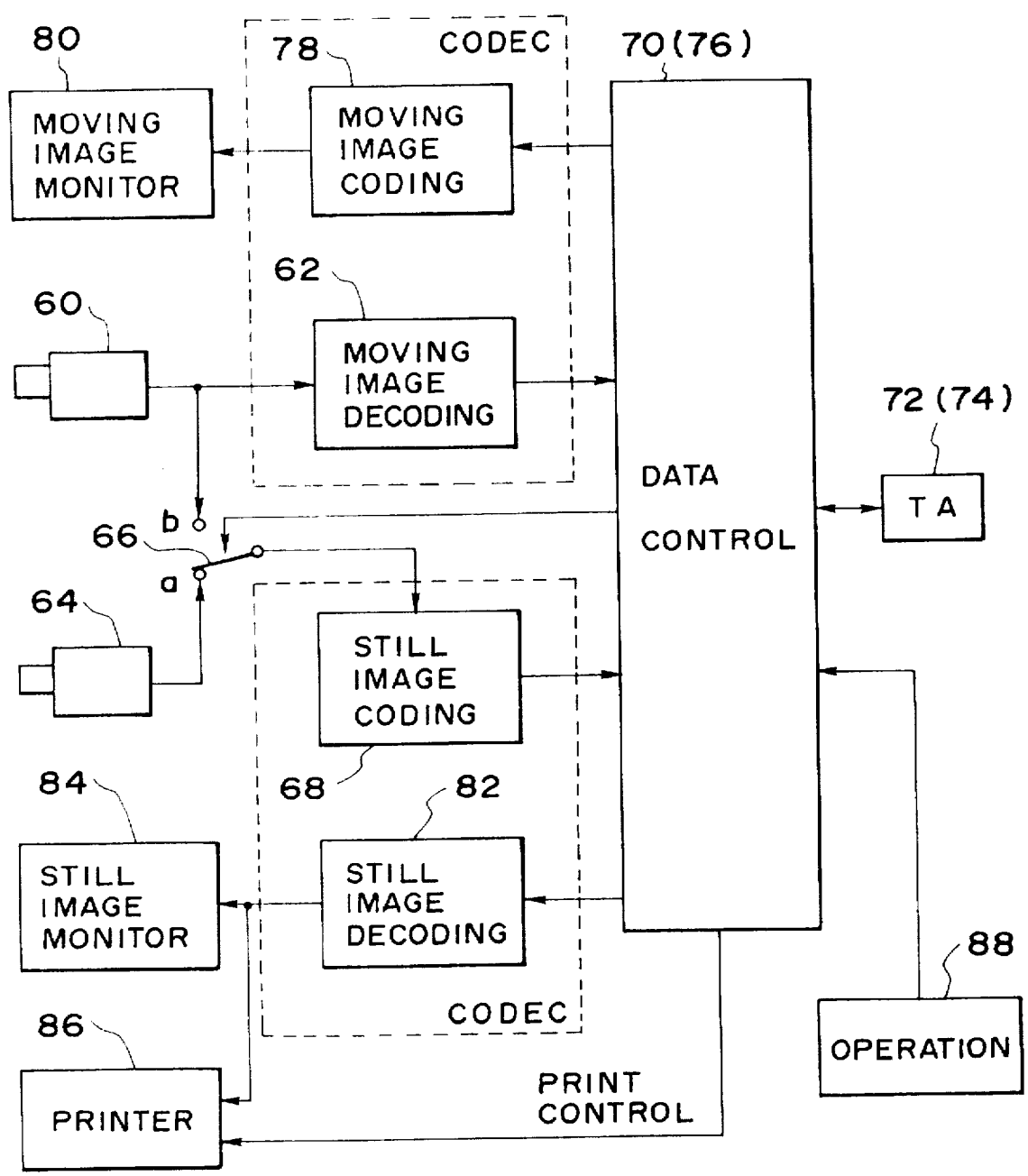

FIG. 3A
FIG. 3B
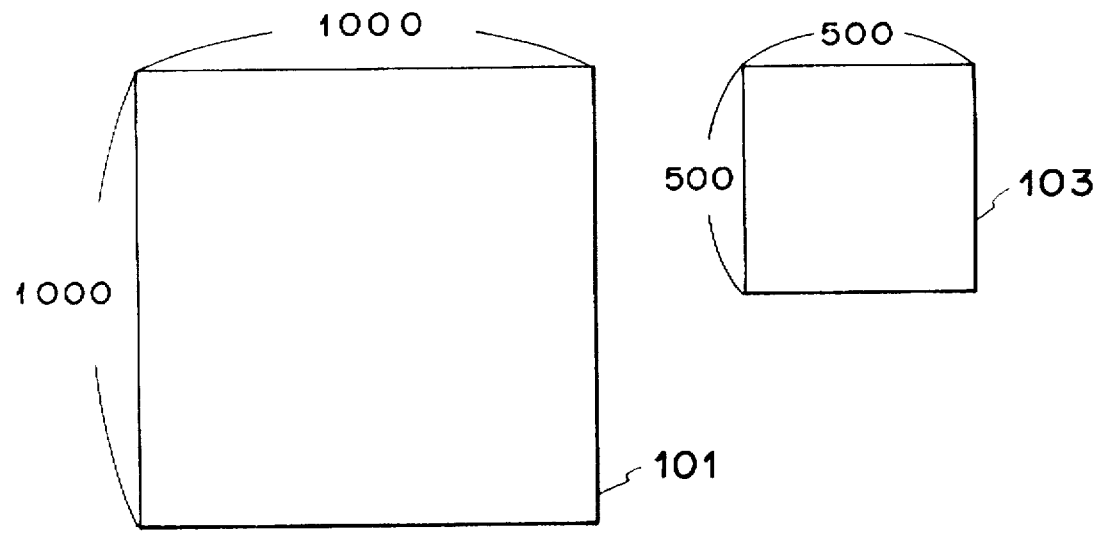
FIG. 4
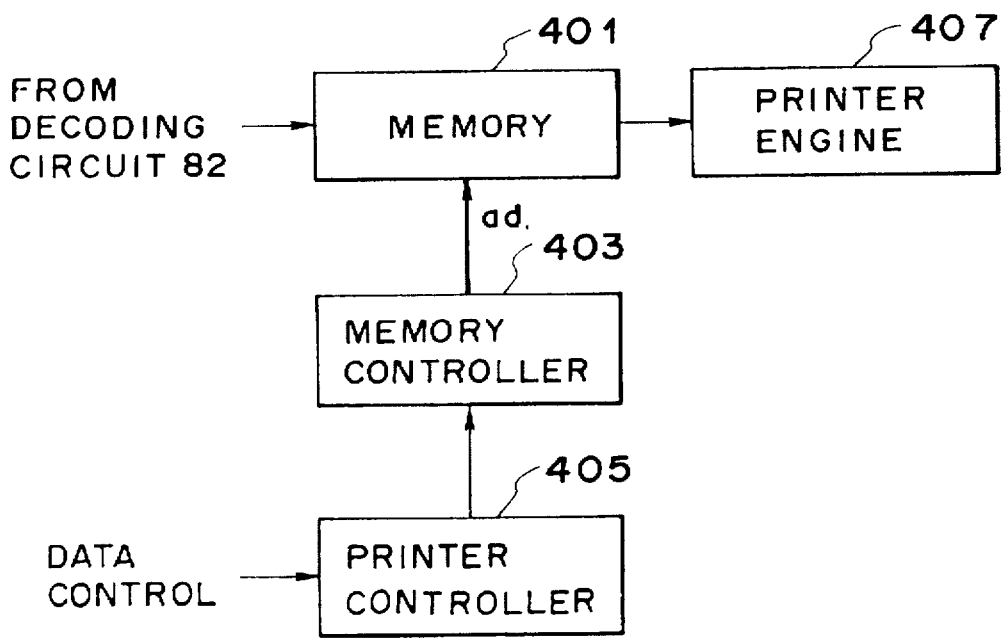

IMAGE TRANSMISSION SYSTEM AND TERMINAL DEVICE

This application is a continuation of application Ser. No. 07/973,668 filed Nov. 9, 1992, now abandoned.

BACKGROUND OF THE INVENTION

1. Field of the Invention

The present invention relates to an image transmission system and a terminal device and, more particularly, to an image transmission system comprising a moving image transmission system and a still image transmission system, and a terminal device in the image transmission system.

2. Related Background Art

A TV conference system which connects a plurality of locations through a leased or public digital line is known. Each of some TV conference systems has a moving image transmission system for transmitting moving images of participants and a still image transmission system for transmitting still images of conference references or the like.

In the conventional TV conference system having the moving image transmission system and the still image transmission system, a receiving terminal has a switch for selectively supplying a received moving or still image to a printer. When a user at the receiving terminal wants to print a transmitted image, a print request is sent from the receiving terminal to a transmission terminal. Upon reception of this print request, the transmission terminal transmits a switching command and a printer control command to the receiving terminal.

With this arrangement, for example, when the image of a conference participant is to be printed, an image signal having poor quality caused by a moving image transmission compression coding scheme is supplied to the printer. A clear printout image of the conference participant cannot therefore be obtained, resulting in inconvenience.

SUMMARY OF THE INVENTION

It is an object of the present invention to provide an image transmission system and a terminal device, which can solve the conventional problem described above.

It is another object of the present invention to provide an image transmission system and a terminal device, which can print a high-quality image.

In order to achieve the above objects of the present invention, there is provided an image transmission system including an image transmission terminal having pickup means for image input and coding means for coding image outputs including moving images from the pickup means for image input in different coding modes, and an image receiving terminal having decoding means for decoding coded information from the coding means and supplying means for supplying images decoded by the decoding means to predetermined output means, comprising control means for controlling a coding mode of the coding means in accordance with an operation of the supplying means.

It is still another object of the present invention to provide an image transmission system having a novel function and a terminal device.

The above and other objects, features, and advantages of the present invention will be apparent from the following detailed description of preferred embodiments in conjunction with the accompanying drawings.

BRIEF DESCRIPTION OF THE DRAWINGS

FIG. 2 is a block diagram showing the overall arrangement of a terminal device according to the embodiment in FIG. 1;

FIGS. 3A and 3B are views of another embodiment according to the present invention, in which FIG. 3A shows the size of image data from a still image camera, and FIG. 3B shows the size of image data from a moving image camera;

FIG. 4 is a block diagram showing the arrangement of a printer in FIGS. 1 and 2.

DETAILED DESCRIPTION OF THE PREFERRED EMBODIMENTS

Figure 1:
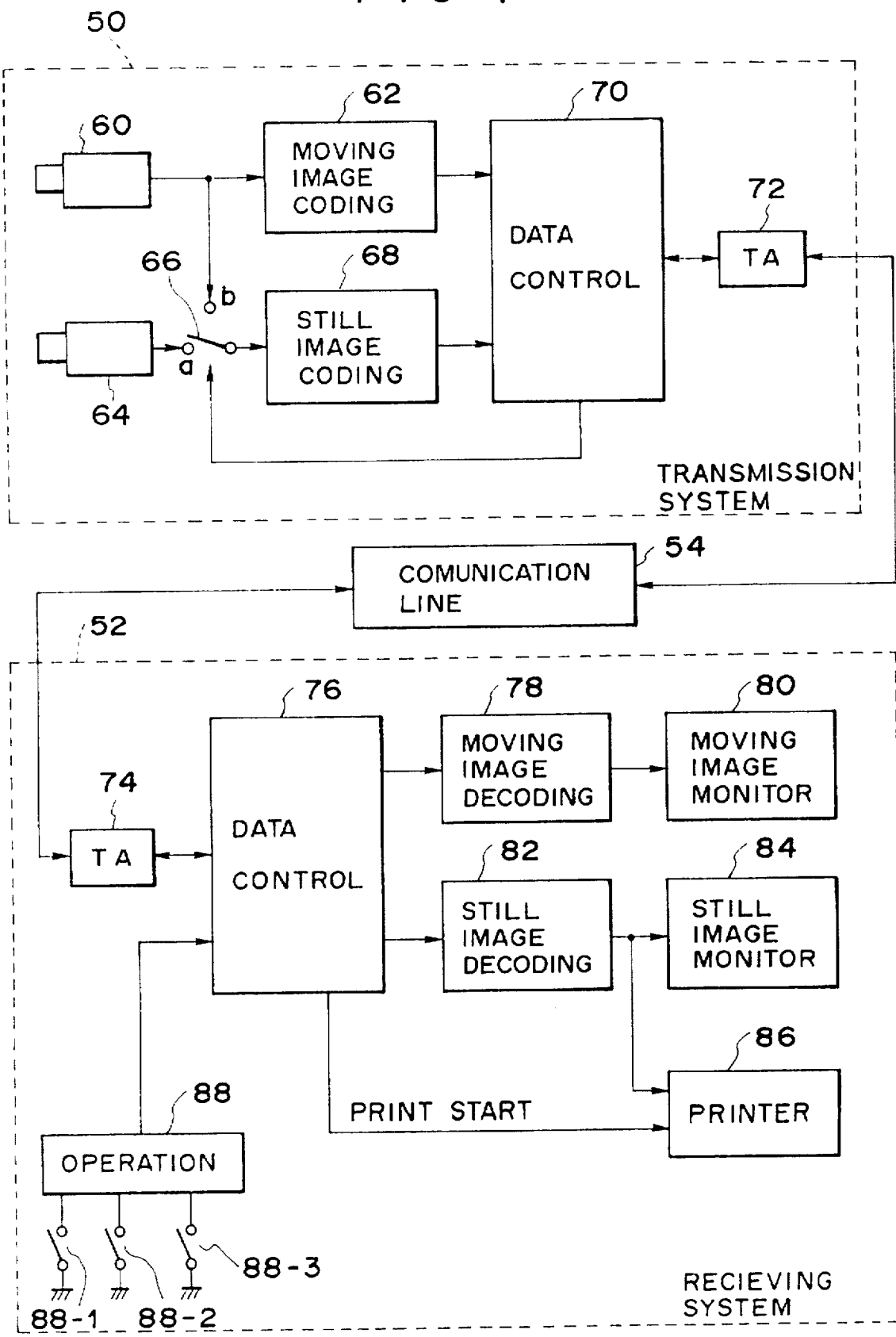
FIG. 1 is a block diagram showing the arrangement of an embodiment of the present invention.

FIG. 1 is a block diagram showing the arrangement of an embodiment according to the present invention. Only image transmission circuit blocks are illustrated in an image transmission terminal device 50, and only image receiving circuit blocks are illustrated in an image receiving terminal device 52. The terminal devices 50 and 52 are connected to each other through a communication line 54 such as an ISDN line.

The terminal device 50 includes a camera 60 for photographing a user of the terminal device 50, a moving image coding circuit 62 for highly efficiently compressing and coding an output (moving image) from the camera 60 into a coding amount suitable for the transmission rate of the communication line 54 (e.g., the moving image coding circuit 62 performs coding on the basis of, e.g., the H261 recommendation), a picture/image camera 64 for photographing drawings and graphs of conference references, a switch 66 for selecting an output from the camera 60 or the picture/image camera 64, a still image coding circuit 68 for compressing and coding the image signal selected by the switch 66 in accordance with a high-efficiency compression coding scheme (e.g., a JPEG or ADPCM scheme) having image quality as the top priority, and a data control circuit 70 for outputting the outputs from the coding circuits 62 and 68 to a terminal adapter (TA) 72 at appropriate timings. Note that the data control circuit 70 controls the switch 66 in accordance with a predetermined command from the terminal device 52 or an operation at the operation panel of the terminal device 50, and that the cameras 60 and 64 have different resolving powers.

The terminal device 52 includes a terminal adapter (TA) 74, a data control circuit 76 for outputting moving image data of all the data received from the terminal adapter (TA) 74 to a moving image decoding circuit 78 and still image data of all the data to a still image decoding circuit 82, a moving image monitor 80, a still image monitor 84, a printer 86 for printing out an output image from the still image decoding circuit 82, and an operation panel 88 for indicating various operations, i.e., selecting a print source (moving/still image) and inputting a printing command.

The terminal adapters (TAs) 72 and 74 assemble and disassemble a packet for the communication line 54.

The coding and decoding schemes in the moving image coding circuit 62 and the moving image decoding circuit 78 are high-efficiency compression coding and decoding schemes for sacrificing image quality (e.g., resolving powers) to some extent so as to assure movement in a line having a limited band. On the other hand, the coding and decoding schemes in the still image coding circuit 68 and the still image decoding circuit 82 are compression coding and decoding schemes having image quality as the top priority rather than the movement. The moving image monitor 80 can have a relatively low resolving power, while the still image monitor 84 has a resolving power higher than the moving image monitor 80. Moving and still images may be simultaneously displayed on one monitor having a resolving power corresponding to still images, as a matter of course.

In a normal state, the switch 66 selects the output from the picture/image camera 64. The image of a conference participant photographed by the camera 60 is compressed and coded by the moving image coding circuit 62, and the coded data is supplied to the data control circuit 70. The image of a conference reference photographed by the picture/image camera 64 is supplied to the still image coding circuit 68 through the switch 66 and is compressed and coded. The coded data is supplied to the data control circuit 70. The data control circuit 70 outputs the data coded by the coding circuits 62 and 68 to the terminal adapter (TA) 72 at appropriate timings. The data control circuit 70 also outputs speech data and a command for the other end of the line to the terminal adapter (TA) 72.

The terminal adapter (TA) 72 forms a packet from the data from the data control circuit 70, and the output from the terminal adapter (TA) 72 is input to the terminal adapter (TA) 74 of the terminal device 52 through the communication line 54.

The terminal adapter (TA) 74 disassembles the packet and outputs received data to the data control circuit 76. The data control circuit 76 outputs moving image data to the moving image decoding circuit 78 and still image data to the still image decoding circuit 82. The speech data and the command are supplied to a processing circuit (not shown) and are processed.

The moving image decoding circuit 78 expands the received moving image data and supplies the expanded data to the moving image monitor 80. The moving image monitor 80 displays the moving image of the user of the terminal device 50. The still image decoding circuit 82 expands the received still image data and supplies the expanded (decoded) still image-signal to the still image monitor 84 and the printer 86 at a predetermined rate. The still image monitor 84 displays the still image photographed by the picture/image camera 64.

When a user at the terminal device 52 wants to print a still image photographed by the picture/image camera 64, he selects the still image as a print source with a switch 88-1 of the operation panel 88 and indicates the start of printing with a switch 88-2. A print source selection signal and a print start command are supplied to the data control circuit 76. The data control circuit 76 supplies the print start command to the printer 86. The printer 86 starts printing in accordance with the print start command. Therefore, a print image of the still image photographed by the picture/image camera 64 is obtained.

When the user at the terminal device 52 wants a print image of the user at the terminal device 50, the user at the terminal device 52 selects a moving image as a print source with the switch 88-2 on the operation panel 88. As may be seen from the details of this operation which will be described later, the image of the conference participant as the target user is displayed as a still image on the still image monitor 84. If framing or the like of this still image is appropriate, the start of printing is indicated.

The print source selection signal is supplied to the data control circuit 76. The data control circuit 76 sends a switching command for the switch 66 from the terminal adapter (TA) 74 to the terminal device 50. This command is input to the terminal adapter (TA) 72 of the terminal device 50 through the communication line 54 and is supplied to the data control circuit 70. The data control circuit 70 switches the switch 66 to the output side of the camera 60 in accordance with the switching command for the switch 66 from the terminal device 52.

The still image coding circuit 68 compresses and codes an output image input from the camera 60 through the switch 66 into a still image. This coded data is supplied to the still image decoding circuit 82 through the data control circuit 70, the terminal adapter (TA) 72, the communication line 54, the terminal adapter (TA) 74, and the data control circuit 76 in the same manner as the image photographed by the picture/image camera 64. The coded data is expanded by the still image decoding circuit 82, and the resultant data is supplied to the still image monitor 84 and the printer 86.

The data control circuit 76 sends a switching command for the switch 66 to the terminal device 50, receives the still image data in response to this command, and sends back a reception end signal to the terminal device 50. In the terminal device 50, in response to the reception end signal, the data control circuit 70 switches the switch 66 to the picture/image camera 64 side. In the terminal device 52, the data control circuit 76 supplies a print start command to the printer 86 in accordance with a print start instruction from the operation panel 88. In this case, when the print start instruction is input from the operation panel 88 upon operation of the switch 88-2 before the image information from the camera 60 is received through a still image transmission system, the data control circuit 76 supplies the print start command to the printer 86 upon completion of reception of the necessary data from the terminal device 50. The printer 86 receives an output image (i.e., an image photographed by the camera 60) from the still image decoding circuit 82 in accordance with the print start command and prints out the input image.

In the above description, two operations, i.e., selection of the print source, and indication of the start of printing, are required. However, operations may be simply limited to selection of moving image printing or still image printing. In this case, in response to a moving image print indication, the data control circuit 76 switches the switch 66 of the terminal device 50, sends a reception end signal to the terminal device 50 upon reception of the image photographed by the camera 60 through the still image transmission system, and supplies the print start command to the printer 86.

Another embodiment of the present invention will be described below.

FIG. 2 is a block diagram of a terminal device having the transmission circuit block of the terminal device 50 in FIG. 1 and a receiving circuit block of the terminal device 52 in FIG. 1. The same reference numerals as in FIG. 1 denote the same parts in FIG. 2. Each of the circuit blocks having the same function is represented by a reference numeral within parentheses. Within the single terminal device, an image from a camera 60 is displayed on a moving image monitor 80, and an image from a picture/image camera 64 is displayed on a still image monitor 84. The image from the camera 60 or 64 can be printed at a printer 86, as a matter of course.

In this embodiment, the camera 60 and the picture/image camera 64 are separate cameras, but can be constituted by a single camera. In this case, a still image is subjected to frame transmission, while a moving image is subjected to field transmission. In printing at the receiving side, if a high-quality image signal is sent, the arrangement is not limited to this embodiment. The printer is exemplified as an output means, but may be replaced with a monitor.

As can be readily understood from the above description, according to the present invention, a moving image normally transmitted through a moving image transmission system can be transmitted through a still image transmission system, and a high-quality image signal can be obtained as a print image at the receiving side. Therefore, a clear, high-quality print image can be obtained.

Still another embodiment of the present invention will be described below. This embodiment exemplifies an operation for changing printer control in accordance with data supplied from a moving image coding circuit 62 or a still image coding circuit 68 in printing at a printer 86.

FIG. 3A is a view showing a size 101 of an image from a picture/image camera 64. In this embodiment, the size 101 is constituted by 1,000×1,000 pixels.

FIG. 3B is a view showing a size 103 of an image from a camera 60. In this embodiment, the size 103 is constituted by 500×500 pixels.

In this embodiment, when an image from the picture/image camera 64 is to be received and printed, data representing a plurality of pictures are printed on a single sheet of paper.

FIG. 4 is a block diagram showing the arrangement of such a printer. The printer includes a memory 401 having a capacity for storing data constituted by 1,000×1,000 pixels as in FIG. 3A, and a memory controller 403 for controlling addressing and read/write access of the memory 401.

A printer controller 405 controls the memory controller 403 so as to control write access of image data to the memory 401 under the control of a data control circuit 76.

A printer engine 407 prints data read out from the memory 401. For example, the printer engine 407 can be, e.g., an electrophotographic printer or bubble Jet printer.

The operation of the embodiment in FIGS. 3A and 3B will be described with reference to the flowchart of FIG. 5.

Figure 5:
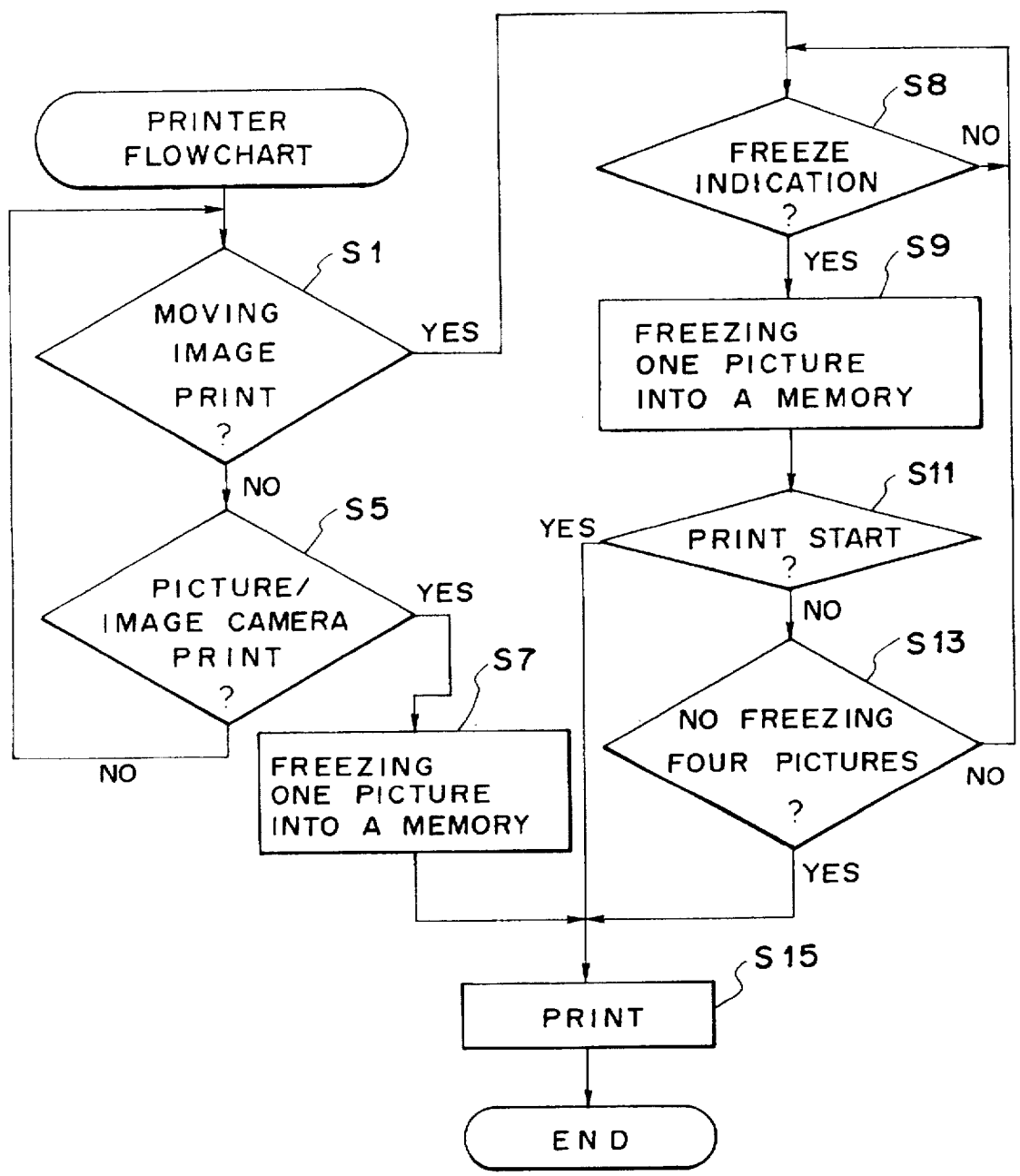
FIG. 5 is a flowchart showing the operation of the embodiment shown in FIGS. 3A and 3B.

Referring to FIG. 5, it is determined whether data from the moving image camera 60 is printed (S1) and then whether data from the picture/image camera 64 is printed (S5).

When data from the moving image camera 60 is to be printed, it is determined whether freezing is indicated (S8). Image data of one picture is frozen in the memory 401. In this case, since the image data of one picture is constituted by data of 500×500 pixels as shown in FIG. 3B, the data can be stored in a capacity ¼the capacity (1,000×1,000 pixels) of the memory 401.

It is determined whether a print start indication is present (S11). If YES in step S11, printing is started. However, if NO in step S11, it is determined whether data of four pictures is frozen in the memory 401 (S13). If NO in step S13, the flow returns to step S8.

On the other hand, when the data of four pictures is frozen in the memory 401, the flow branches to step S15. In step S15, image data is read out from the memory 401, and at the same time printing is executed.

In the embodiment described above, different printing methods are used when image data from the moving image camera is frozen and when image data from the still image camera is frozen. Therefore, efficient printing operations can be performed with required degrees of image quality.

What is claimed is:

1. An image processing apparatus comprising:

image pickup means for generating a moving image;

first compression processing means for executing compression for the moving image;

second compression processing means for executing compression for a still image;

receiving means for receiving an instruction signal for instructing said second compression processing means via a communication line from an external image processing apparatus;

control means for changing a compression process for the moving image generated by said image pickup means from said first compression processing means to said second compression processing means in response to the instruction signal received by said receiving means; and transmission means for transmitting the image compressed by said second compression processing means to said external image processing means.

wherein the instruction signal is transmitted via communication line in response to a manual instruction in said external image processing apparatus.

2. An apparatus according to claim 1, wherein the compression for the moving image includes H.261.

3. An apparatus according to claim 1, wherein the compression for the still image includes ADPCM and JPEG.

4. An image processing apparatus which receives a coded image from an external image processing apparatus having coding means which is able to execute compression for a moving image and compression for a still image, said apparatus comprising:

manual setting means for selectively setting a compression method in the external image processing apparatus between the compression for the moving image and the compression for the still image;

transmission means for transmitting a coding setting signal instructing the compression method corresponding to the setting set by said manual setting means to the external image processing apparatus;

receiving means for receiving the image compressed by the compression method set by said manual setting means from the external image processing means; and decoding means for decoding the compressed image received by said receiving means by a coding method corresponding to the compression method.

5. An apparatus according to claim 4, wherein the compression for the moving image is high efficiency compression.

6. An apparatus according to claim 4, wherein the compression for the still image is image quality priority compression.

7. An image processing means which processes an image received from an external image processing apparatus having:

image pickup means for generating a moving image, coding means which is able to execute compression by a plurality of compression methods, and transmission means for compressing an image generated by the image pickup means by the coding means and transmitting the compressed image, said image processing apparatus comprising:

instruction means for manually instructing a generation of a still image;

transmission means for transmitting a control signal for changing a compression method of the coding means in the external image processing apparatus to a compression method for a still image, in response to an instruction by said instruction means; and receiving means for receiving the compressed image for the still image from the external image processing apparatus in response to the control signal transmitted by said transmission means.

8. An apparatus according to claim 7, wherein the plurality of compression methods include movement priority compression for a moving image and an image quality priority compression for the still image.

9. An apparatus according to claim 7, further comprising image forming means for visualizing the image received by said receiving means.

10. An apparatus according to claim 7, wherein the compression for the still image includes JPEG and ADPCM.

11. An image processing apparatus comprising:

image pickup means for generating a moving image;

coding means which is able to execute compression for the moving image and compression for a still image;

receiving means for receiving a coding setting signal from an external image processing apparatus connected via a communication line;

control means for setting a compression method executed by said coding means for the image generated by said image pickup means, in response to the coding setting signal received by said receiving means; and transmission means for transmitting an image made by compressing the moving image generated by said image pickup means by the compression method set by said control means, wherein the coding setting signal is generated by a manual instruction in a operation unit of said external image processing apparatus.

12. An apparatus according to claim 11, wherein the compression of the moving image is movement priority compression.

13. An apparatus according to claim 11, wherein the compression for the still image is image quality priority compression.

14. A method for controlling an image processing apparatus, said method comprising the steps of:

generating a moving image signal;

receiving an instruction signal for instructing a compression processing means via a communication line from an external image processing apparatus, where the instruction signal is transmitted via the communication line in response to a manual instruction in the external image processing apparatus;

changing a compression process for the moving image generated in said generating step from a first compression processing means to a second compression processing means in response to the instruction signal received in said receiving step, where the first compression processing means executes compression for the moving image and the second compression processing means executes compression for a still image; and transmitting the image compressed by the second compression processing means to the external image processing means.

15. A method for controlling an image processing apparatus which receives a coded image from an external image processing apparatus having coding means which is able to execute compression for a moving image and compression for a still image, said method comprising the steps of:

manually setting a compression method in the external image processing apparatus between the compression for the moving image and the compression for the still image;

transmitting a coding setting signal instructing a compression method corresponding to the setting in said setting step to the external image processing apparatus;

receiving the image compressed by the compression method set in said setting step from the external image processing means; and decoding the compressed image received in said receiving step by a coding method corresponding to the compression method.

16. A method for controlling an image processing means which processes an image received from an external image processing apparatus having image pickup means for generating a moving image, coding means which is able to execute compression by a plurality of compression methods, and transmission means for compressing an image generated by the image pickup means by the coding means and transmitting the compressed image, said method comprising the steps of:

manually instructing a generation of a still image;

transmitting a control signal for changing the compression method of the coding means in the external image processing apparatus to a compression method for a still image, in response to the instruction in said instruction step; and receiving the compressed image for the still image from the external image processing apparatus in response to the control signal transmitted in said transmitting step.

17. A method for controlling an image processing apparatus, said method comprising the steps of:

generating a moving image signal;

receiving a coding setting signal from an external image processing apparatus connected via a communication line, where the coding setting signal is generated by a manual instruction in a operation unit of the external image processing apparatus;

setting one of a plurality of compression methods to be executed, in response to the coding setting signal received in said receiving step, where the compression methods include compression for the moving image and compression for a still image;

compressing the moving image signal generated in said generating step by the compression method set in said setting step;

transmitting an image made by compressing the moving image signal in said compressing step.

* * * * *

UNITED STATES PATENT AND TRADEMARK OFFICE
CERTIFICATE OF CORRECTION

PATENT NO. : 5,751,445

DATED : May 12, 1998

INVENTOR(S): MAKOTO MASUNAGA

Page 1 of 2

It is certified that error appears in the above-identified patent and that said Letters Patent is hereby corrected as shown below:

ON COVER PAGE AT [76] INVENTORS

"[76]  Inventor:   Makoto Masunaga, c/o Canon Kabushiki Kaisha 30-2, 3-chome, Shimomaruko, Ohta-ku, Tokyo, Japan"

should read

--[76] Inventor:   Makoto Masunaga, Tokyo, Japan--.

COLUMN 3

Line 39, "image-signal" should read --image signal--;
Line 44, "he" should read --he or she--.

COLUMN 5

Line 36, "Jet" should read --jet--;
Line 48, "1/4the" should read --1/4 the--.

UNITED STATES PATENT AND TRADEMARK OFFICE
CERTIFICATE OF CORRECTION

PATENT NO. : 5,751,445

DATED : May 12, 1998

INVENTOR(S): MAKOTO MASUNAGA

It is certified that error appears in the above-identified patent and that said Letters Patent is hereby corrected as shown below:

COLUMN 6

Line 53, "image," should read --image;--;
Line 54, "coding" should read --¶ coding--;
Line 55, "methods," should read --methods;--.

COLUMN 7

Line 31, "a" should read --an--.

COLUMN 8

Line 46, "a" should read --an--.

Signed and Sealed this

Twenty-eighth Day of December, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,751,445
DATED : May 12, 1998
INVENTOR(S) : Makoto Masunaga

It is certified that error appears in the above-identified patent and that said Letters Patent is hereby corrected as shown below:

On the title page, item [76] should read –[75] Makoto Masunaga, Tokyo, Japan

On the title page, insert -- item [73] Assignee: Canon Kabushiki Kaisha, Tokyo, Japan --

Signed and Sealed this

Eighteenth Day of April, 2000

Attest:

Q. TODD DICKINSON

*Attesting Officer*   *Director of Patents and Trademarks*